United States Patent

Yoneda et al.

Patent Number: 5,222,684
Date of Patent: Jun. 29, 1993

[54] TAPE DRIVING APPARATUS FOR TAPE MEDIUM RECORD REPRODUCING APPARATUS

[75] Inventors: Yasuhiro Yoneda, Settsu; Haruo Hiraishi, Neyagawa, both of Japan

[73] Assignee: Matsushita Electric Industrial Co., Ltd., Osaka, Japan

[21] Appl. No.: 895,465

[22] Filed: Jun. 8, 1992

Related U.S. Application Data

[63] Continuation of Ser. No. 671,968, Mar. 18, 1991, abandoned.

[30] Foreign Application Priority Data

Mar. 19, 1990 [JP] Japan .............................. 1-68850
Nov. 14, 1990 [JP] Japan .............................. 2-309822

[51] Int. Cl.⁵ ............................................ B65H 77/00
[52] U.S. Cl. .................................. 242/186; 242/191; 242/75.51; 318/7
[58] Field of Search ............ 242/186, 187, 191, 75.51, 242/75.52; 318/6, 7

[56] References Cited

U.S. PATENT DOCUMENTS

| | | | |
|---|---|---|---|
| 3,814,310 | 6/1974 | Safiuddin et al. | 318/6 |
| 4,015,799 | 4/1977 | Koski et al. | 318/7 |
| 4,256,996 | 3/1981 | Brooks et al. | 318/7 |
| 4,398,227 | 8/1983 | Anderson | 318/7 |
| 4,448,368 | 5/1984 | Shalko | 242/186 |
| 4,461,433 | 7/1984 | Kani | 242/75.51 |
| 4,525,654 | 6/1985 | Tajima et al. | 242/75.51 |
| 4,532,597 | 7/1985 | Safiuddin et al. | 242/75.51 |
| 4,762,663 | 10/1973 | Nedreski | 242/75.51 |
| 4,802,777 | 2/1989 | Yamada | 318/7 |

FOREIGN PATENT DOCUMENTS

| | | | |
|---|---|---|---|
| 52-76904 | 6/1977 | Japan | 242/186 |
| 54-111806 | 9/1979 | Japan | 242/186 |
| 61-192656 | 8/1986 | Japan | 242/75.51 |
| 2087104A | 5/1982 | United Kingdom . | |

Primary Examiner—Daniel P. Sodola
Assistant Examiner—John Q. Nguyen
Attorney, Agent, or Firm—Wenderoth, Lind & Ponack

[57] ABSTRACT

A tape driving apparatus includes both supply and takeup reel diameter detectors so as to compute the inertia of both the reels, wherein the acceleration/deceleration torque information spent in the acceleration/deceleration of the take-up reel is detected from the take-up reel torque information so as to compute the take-up reel acceleration/deceleration compensating torque from the acceleration/deceleration torque information, both the reel diameters, and the inertia information, and the supply reel torque is controlled with the information with the computed results and the back torque information proportional to the supply reel diameter being added to it. The the access property of the tape is thereby improved.

3 Claims, 9 Drawing Sheets

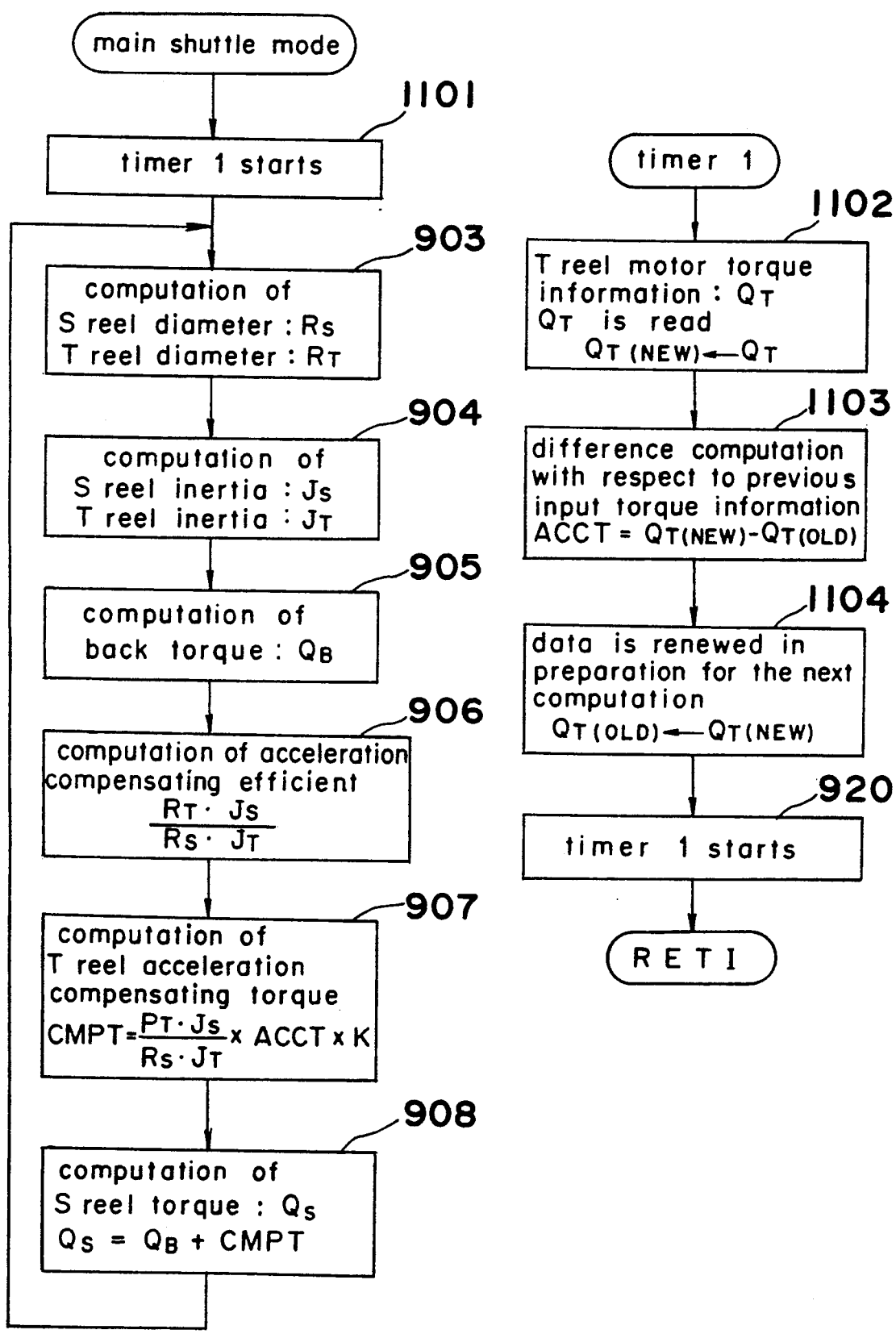

TAPE DRIVING APPARATUS FOR TAPE MEDIUM RECORD REPRODUCING APPARATUS

This application is a continuation of now abandoned application Ser. No. 07/671,968, filed on Mar. 18, 1991.

BACKGROUND OF THE INVENTION

The present invention generally relates to a tape driving apparatus for controlling the transportation of a tape medium by a supply reel and a winding reel.

In recent years, a highly efficient tension control art which prevents tape damage has been demanded, because of the use of thinner tapes in the tape driving apparatus. Also, the tape driving mechanism is also simplified with the demands for smaller size, lighter weight, thinner size of the apparatus being provided. Therefore, the tape driving apparatus is provided which is simplified in mechanism without provision of the tension detecting sensor of the tape.

The conventional tape driving apparatus (hereinafter a VCR will be described as a representative by way of example) is shown in, for example, Japanese Patent Application Publication Tokkaisho No. 60 - 163258.

The conventional tape tension controlling method will be described hereinafter. The conventional tape tension controlling method is to constantly control the tape tension by the application, upon the supply reel diameter, of a back torque proportional to the supply reel diameter. The principle thereof will be described. The formula is as follows $$STSN \times Rs = Qs \qquad (1)$$

wherein STSN: tape tension in supply reel
R2: supply reel radius
Q2: supply reel motor torque Therefore, it has been determined that the torque proportional to the supply reel diameter has only to be applied to the supply reel motor in order to retain the tape tension STSN constant when the tape is transported at a constant speed.

But the above described construction has the following problems. Namely, the VCR has not only the modes of the recording, and the normal reproduction, but also the operation modes called jog and shuttle. The tape speeds except for the tape speed at the normal reproduction time exist, with the tape acceleration and deceleration being repeated. At this time, in the method of applying the torque proportional to the above described supply reel diameter, the tape tension may be retained constant under the conditions where the tape is transported at the constant speed, with the fluctuations of the dynamic tension to be caused by the acceleration and the deceleration of the tape being impossible to be suppressed. In the conventional tape driving apparatus, the acceleration/deceleration responses are delayed in the acceleration/deceleration of the tape so as to reduce the fluctuations of the tension. Therefore, the transportation of the tape to the object point of the tape is delayed so as to sacrifice the access property of the tape.

The tape driving apparatus to be used for the external memory apparatus of the computer will be described hereinafter in the conventional embodiment. In the tape driving apparatus described in Japanese Patent Publication Tokkosho No. 59-20178, the current for driving the reel motor is divided into three components such as acceleration current, tension current, drag current in the acceleration and the deceleration of the tape. The reel radius and the inertia are detected, and the tape acceleration speed is obtained from the target speed to be controlled, the present tape speed and the tape acceleration from the enacted time, with a method of computing, setting the driving current of the reel so that the tape tension may become constant.

But in the above described construction, the tape running loads changes with the changes in environment where the tape driving apparatus is provided, with the aging, the drag current component does not become constant, with a problem that the tape tension has been changed. In order to correct the problem, a tension detection sensor is provided. Accordingly the requirement of the tape tension sensor interferes with the smaller size and the lighter weight of the apparatus.

SUMMARY OF THE INVENTION

Accordingly, the present invention has been developed with a view to substantially eliminating the above discussed drawbacks inherent in the prior art, and has for its essential object to provide an improved tape driving apparatus for a tape medium record reproducing apparatus.

Another important object of the present invention is to provide an improved tape driving apparatus for a tape medium record reproducing apparatus, which is adapted to effect the tension control in the construction except for the tension detecting sensor so as to contribute towards the smaller size and lighter weight of the tape driving apparatus.

Still another object of the present invention is to provide an improved tape driving apparatus for a tape medium record reproducing apparatus, which is adapted to quicken the acceleration/deceleration of the tape so as to improve the access property. Also, the tape speed detector such as timer roller or the like is removed in the tape speed controlling operation so as to contribute towards the smaller size and the lighter weight of the tape driving apparatus.

In accomplishing these and other objects, according to one preferred embodiment of the present invention, there is provided a tape driving apparatus which comprises a supply reel diameter detecting means for detecting the radius information Rs of the supply reel, a winding reel diameter detecting means for detecting the radius information Rt of the winding reel, a supply reel inertia computing means for computing the information Js corresponding to the inertia of the supply reel under the radius information Rs of the supply reel, a winding reel inertia computing means for computing the information $J_T$ corresponding to the inertia of the winding reel under the radius information Rt of the winding reel, a winding reel acceleration torque detecting means for detecting the information ACCT corresponding to the torque amount spent in the acceleration/deceleration of the winding reel, a winding reel acceleration compensating torque computing means for computing the acceleration compensating torque information CMPT corresponding to the acceleration/deceleration of the winding reel by the use of the radius information Rs and Rt of both the reels, the inertia information Js and $J_T$ of both the reels, the winding reel acceleration torque information ACCT, a back torque computing means for computing the back torque information $Q_B$ proportional to the radius information Rs of the feed reel, an adding means for adding the back torque information $Q_B$ to the acceleration compensating torque information CMPT.

In the above described construction of the present invention, the static tension fluctuations which are caused by the changes in the reel diameter are corrected by the back torque information $Q_B$ to be computed from the radius information Rs of the supply reel. Also, the dynamic tension fluctuations which are caused by the acceleration/deceleration in the reel diameter are suppressed by the acceleration compensating torque information CMPT, so that the tension control may be realized without the use of the tension detecting sensor.

BRIEF DESCRIPTION OF THE DRAWINGS

These and other objects and features of the present invention will become apparent from the following description taken in conjunction with the preferred embodiments thereof with reference to the accompanying drawings, in which:

FIG. 11 is a flowchart in a case where the block in FIG. 1 is composed of microcomputers.

DETAILED DESCRIPTION OF THE INVENTION

Figure 1:
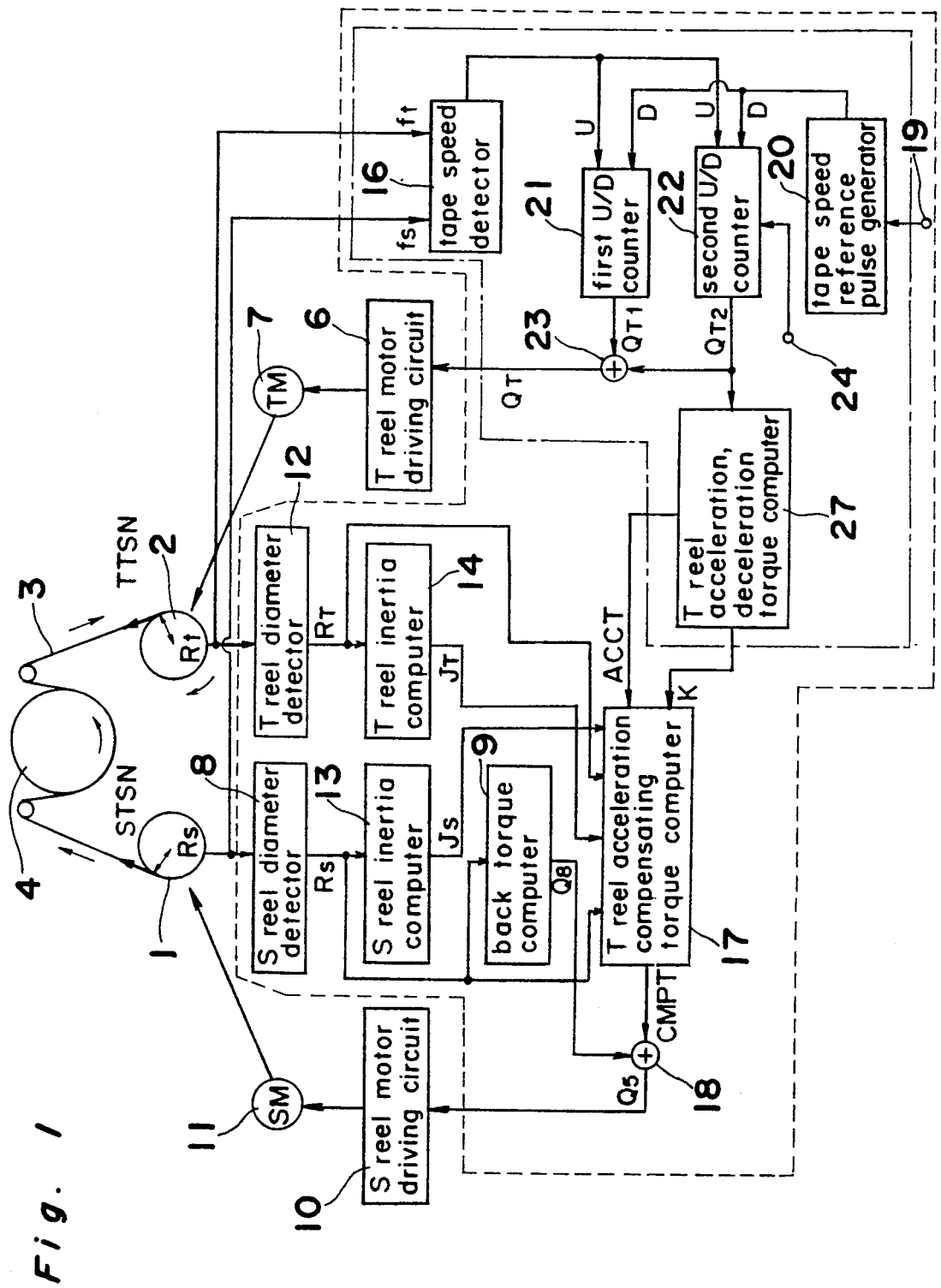
FIG. 1 is a block diagram showing the construction of a tape driving apparatus in accordance with a first embodiment of the present invention.

Before the description of the present invention proceeds, it is to be noted that like parts are designated by like reference numerals throughout the accompanying drawings.

In the present invention, the torque of the S reel motor is controlled with the error information with the back torque information proportional to the S reel diameter and the acceleration compensating torque information for suppressing the tension fluctuations to be caused by the acceleration, deceleration of the tape transportation being added in it.

Referring now to the drawings, there is shown in FIG. 1, the block diagram of a tape driving apparatus in accordance with a first embodiment of the present invention, which includes a supply reel 1 (hereinafter referred to as an S reel), a winding reel (hereinafter referred to as an T reel), with the tape 3 being wound around a drum 4 (which is rotating in the direction of the arrow as shown) mounted on the rotary magnetic head (not shown) and being transported in the direction of the arrow. A T reel motor driving circuit 6 causes the torque in a T reel motor (hereinafter referred to as a TM) 7 to be proportional to the T reel motor torque information Qt. An S reel diameter detector 8 outputs the information Rs proportional to the radius of the S reel 1. A back torque computer 9 outputs the back torque information QB to an adder 18 through the computing operation shown by the formula (1). An S reel motor driving circuit 10 is adapted to operate so as to cause the torque in the reel motor (hereinafter referred to as an SM) to be proportional to the S reel torque information Qs from the adder 18. A T reel radius detector 12 detects the information $R_T$ corresponding to the reel radius of the T reel 2; a S reel inertia computer computes the S reel inertia Js in accordance with the radius information Rs of the S reel; a T reel inertia computer 14 computes the the T reel, inertia $J_T$ under the radius information $R_T$ of the T reel; a T reel acceleration/deceleration torque detector 15 (which is a block surrounded by one dot chain lines) detects the torque spent in the acceleration/deceleration of the T reel 1 from a method of the speed controlling of the T reel to be described later; a tape speed detector 16 detects the tape speed and generates pulses with a frequency proportional to the detection result; a T reel acceleration compensating torque computer 17 effects the acceleration compensating computing operation so as to compensate for the tension variation caused by the acceleration/deceleration of the T reel 1; an adder 18 adds the back torque information $Q_B$ proportional to the S reel diameter to the T reel acceleration compensating torque information CMPT; a terminal 19 feeds the tape speed target instructions, a tape speed reference pulse generator 20 generates pulses of a frequency proportional to the target tape speed fed from the terminal 19; first and second up/down counters (hereinafter referred to as U/D counters) 21 and 22 connect the clock pulses fed from the tape speed detector 16 to a count up terminal, and connect the clock pulses to be fed from the tape speed reference pulse generator 20 to a count down terminal; an adder 23 adds the output information $Q_{T1}$ of the first U/D counter 21 to the output information $Q_{T2}$ of the second U/D counter 22; a terminal 24 latches the output information $Q_{T2}$ of the second U/D counter 22 for each constant time period so as to feed the timing signal which is adapted to initialize the value of the counter immediately after it. A T reel acceleration/deceleration torque computer 27 inputs the output information $Q_{T2}$ of the second U/D counter 22 and outputs to the T reel acceleration compensating torque computer 17 the acceleration/deceleration torque information ACCT of the T reel and the proportional constant K to be described later.

The back torque information $Q_B$ proportional to the S reel diameter is obtained through the S reel diameter detector 8, the back torque computer 9 and is fed to the adder 18 as in the description of the conventional embodiment.

The correction of the tension fluctuations in the acceleration/deceleration of the tape transportation will be described hereinafter.

The dinetic formulas of both the S and T reels are as follows.

$$Js \times a\omega s = Qs - Rs \times STSN \quad (2)$$

$$J_T \times a\omega_T = Q_T - R_T \times TTSN \quad (3)$$

wherein
Rs: S reel radius
$R_T$: T reel radius
Js: S reel inertia
$J_T$: T reel inertia
STSN: tape tension of the S reel
TTSN: tape tension of the T reel
$Q_T$: T reel motor torque
$\omega s$: S reel rotation angle speed
$\omega_T$: T reel rotation angle speed
$a\omega s$: S reel rotation acceleration
$a\omega_T$: T reel rotation acceleration The relationship between the tape tension STSN of the S reel and the tape tension TTSN of the T reel is $$TTSN = a \times STSN \quad (4)$$

wherein the a is a proportional coefficient determined with a tape running pass.

Also, the tape speed V is as follows.

$$V = Rs \times \omega s = R_T \times \omega_T \quad (5)$$

In order to maintain the tape tension constant if the rotation acceleration $a\omega s$ of the S reel changes at the tape acceleration and deceleration time from the (2) formula, the correcting torque dQs (change portion of the Qs) has only to be established as in the following formula.

$$dQs = Js \times da\omega s \quad (6)$$

wherein the $da\omega s$ is the variation portion of the $a\omega s$. From the (5) formula, the relationship of both the S and T reel rotation accelerations is as follows.

$$da\omega_T = (Rs/R_T) \times da\omega s \quad (7)$$

From the (3) formula, the following formula is established in the condition where the tape tension is controlled so as to be constant.

$$da\omega_T = dQ_T/J_T \quad (8)$$

The proportional coefficient a of the (4) formula is different in the transportation direction of the tape. This is because the running load is different when the tape is transported in the same direction as the rotation direction of the drum 4 then it is when the tape transported in the opposite direction, and furthermore the tape is restrained in running in a post for winding the tape 3 around the drum 4, and so on. Thus, a proportional coefficient k corresponding to the tape running load is introduced.

The S reel motor correcting torque dQs for suppressing the tension fluctuations is as follows.

$$dQs = K(R_T/Rs) \times (Js/J_T) \times dQ_T \quad (9)$$

Namely, detect both the S, T reel diameters and the inertia, the acceleration/deceleration torque fluctuation amount of the T reel motor, and effect the torque connection shown in the (9) formula upon the S reel motor, and the dynamic tension fluctuation accompanied by the acceleration and the deceleration of the tape may be controlled.

The above described tension control will be described with reference to FIG. 1.

In FIG. 1, reference numeral 8 is a S reel diameter detector, to which the information Rs corresponding to the S reel radius is outputted. Likewise, the information $R_T$ corresponding to the T reel radius is outputted to the T reel diameter detector 12. In the S reel inertia computer 13, the inertia Js of the S reel 1 is computed under the S reel radius information Rs.

Generally the inertia J of the reel is shown by the formula (10).

$$J = Jfix + Jvar \quad (10)$$

J: reel inertia
Jfix: inertia (invariant to the reel diameter) of the reel motor, the empty reel inertia and so on.
Jvar: tape inertia (proportional to the reel diameter)

$$Jvar = K1 \times (R^4 - Rh^4) \quad (11)$$

K1: constant
R: reel radius
Rh: reel hub radius

If the reel radius R may be measured from the formulas (10) and (11), the reel inertia J may be computed.

Figure 2:
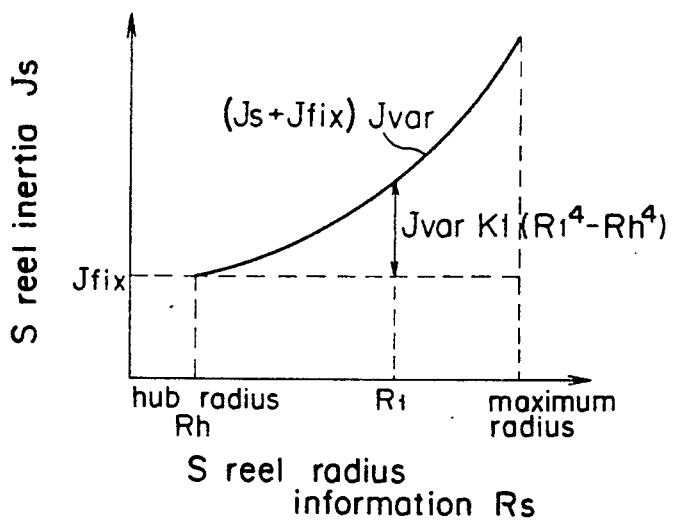
FIG. 2 is a characteristic chart showing one example of the characteristics of the S reel inertia Js with respect to the S reel radius information Rs.
Figure 3:
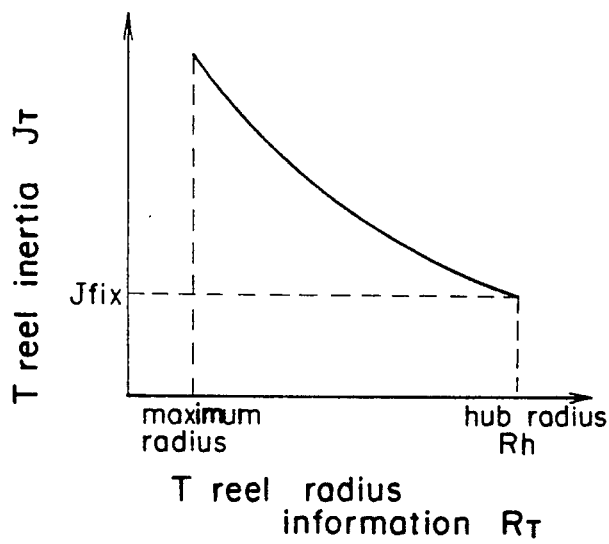
FIG. 3 is a characteristic chart showing one example of the characteristics of the T reel inertia $J_T$ with respect to the T reel radius information $R_T$.

The S reel inertia information Js is computed in accordance in accordance with the formula (10) by the S reel inertia computer 13. The T reel inertia information $J_T$ is computed in accordance with the formula (11) by the T reel inertial computer 14. FIG. 2 is a characteristic chart showing the operation result of the S reel inertia Js corresponding to the radius information Rs of the S reel 1. FIG. 3 is a characteristic chart (the abscissas axis is shown in the order from the maximum radius to the hub radius so as to correspond to the S reel radius) of the radius information $R_T$ of the T reel 2 and the T reel inertia $J_T$.

The control of the T reel motor 7 will be described before the detecting method of the torque information to be spent on the acceleration/deceleration of the T reel 2 is described.

Since the shuttle mode exists in the VCR as described hereinabove, a plurality of types of tape target speeds exist. In the control for driving the winding side reel, the actual tape speed is detected so as to become a target tape speed output from the system control and so on so as to detect the error signal with respect to the target speed. The error signal is fed back to the T reel motor driving circuit to effect the tape speed controlling.

The tape speed control will be described in accordance with the FIG. 1.

The rotation pulses fs and ft of frequencies proportional to the rotation of both the reels are inputted to the tape speed detector 16 in FIG. 1 so as to detect the tape speed from the rotation frequencies of both the reels. The rotation frequencies of both the reels are used in the detection of the tape speed as known. Even in the present embodiment, it is composed of an example in using the total information of both the reel rotation frequencies.

Figure 5:
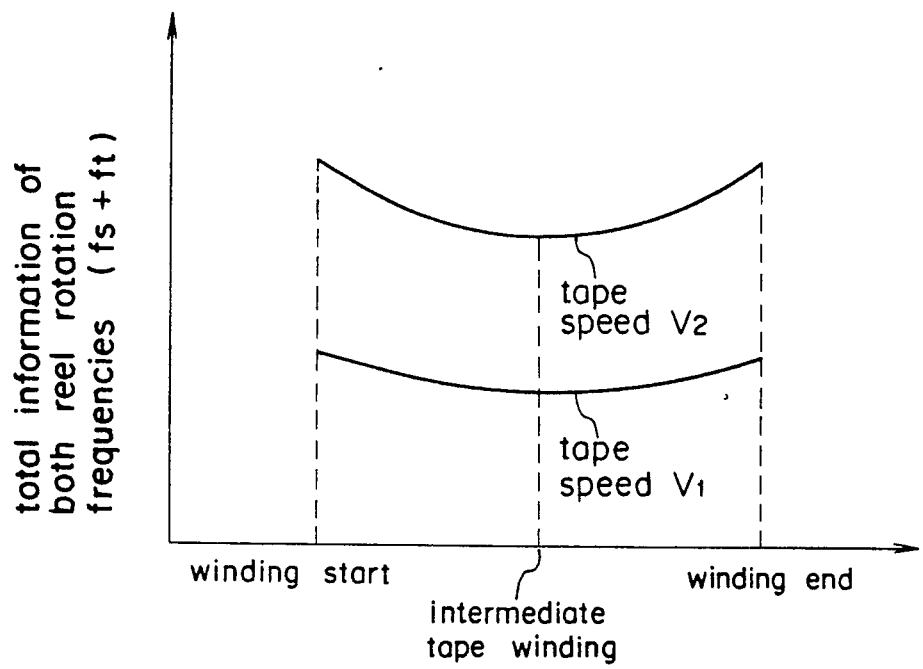
FIG. 5 is a characteristic chart showing the characteristics of the total information of the rotation frequency of both the reels in the transportation of the constant tape speed, and of the tape winding diameter.

FIG. 5 is a relationship chart showing the relationship among the tape speed, the total information fs+ft of both the reel rotation frequencies and the tape winding diameter. When the tape speed shows V1 and V2 (V1<V2), it is found out that the total information fs+ft of both the reel rotation frequencies are proportional if the tape winding diameter is in the same place. If the tape speed reference information to be controlled is corrected from the tape winding diameter information, it is possible to control the tape speed constantly from the winding start to the winding end.

Figure 6:
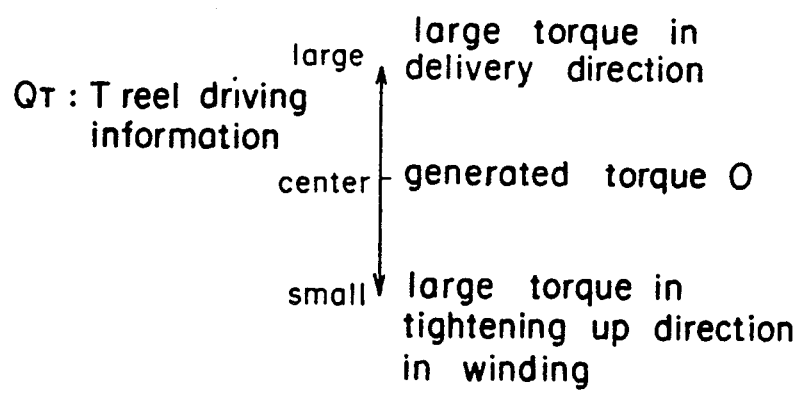
FIG. 6 is a characteristic chart showing the relationship between the T reel driving information $Q_T$ to be fed to the T reel motor driving circuit 6 in FIG. 1 and the caused torque of the T reel motor 7.
Figure 7A:
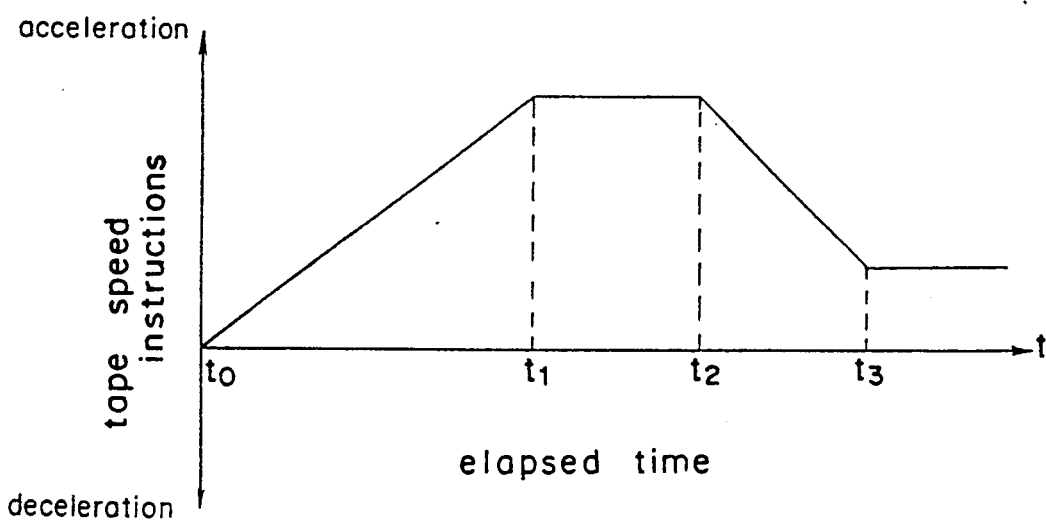
FIGS. 7(a)-7(d) are waveform charts showing the relationship of the various information signals of a tape speed control system in FIG. 1 when the target tape speed has been accelerated/decelerated.
Figure 7B:
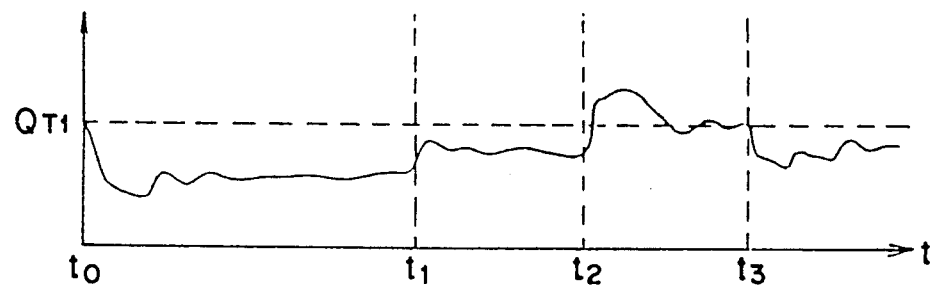
Figure 7C:
Figure 7D:
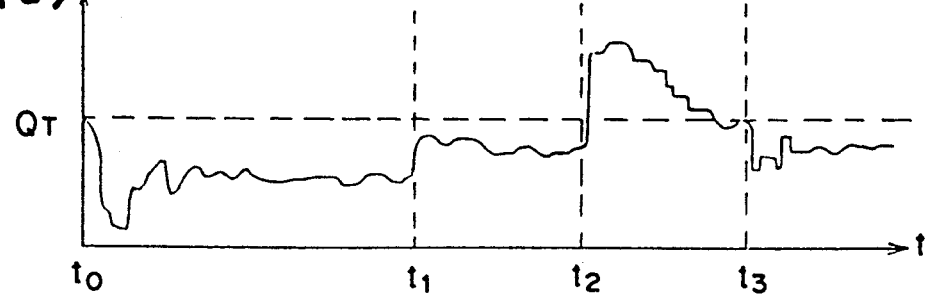

FIG. 6 is a relationship chart showing the relationship between the T reel driving information $Q_T$ to be fed to the T reel motor driving circuit 6 in FIG. 1 and the torque-to-be-caused of the T reel motor 7. When the T reel driving information $Q_T$ is at the center, the generated torque of the T reel motor is zero. As the value of the driving information $Q_T$ becomes smaller, the generated torque becomes larger in the direction along which the tape is tightened up in the winding. Conversely, as the value of the driving information $Q_T$ becomes larger, the generated torque becomes larger in a direction along which the tape is delivered.

The controlling of the tape speed at the target speed will be described hereinafter with reference to FIG. 1 and FIGS. 7(a)-7(d).

FIG. 7 (a) shows the tape speed instructions to change as time passes, wherein time t0 to t1, time t1 to t2, time t2 to t3 are respectively acceleration, fixed speed, deceleration in the tape speed instructions. Also, FIGS. 7(b) 7(c), and 7(d) show the changes in the output information $Q_{T1}$ of a first U/D counter 21, the output information $Q_{T2}$ of a second U/D counter 22, the output information $Q_T$ of the adder 23.

In FIG. 1, the tape speed instructions are fed to the tape speed reference pulse generator from the terminal 19 with the clock pulses corresponding to the target speed corresponding to the target speeds being fed onto the side of the count down both at the first, second U/D counters 21, 22. In the condition where the tape is stopped or is transported slower than the control target speed, the frequencies of the clock pulses connected onto the side of the count up of the respective U/D counters 21 and 22 from the tape speed detector 16 are slower than the frequencies of the clock pulses connected onto the side of the count down, so that the counter values of the first and second U/D counters 21 and 22 become lower. The output information $Q_T$ of the adder 23 is also lowered, so that the T reel motor driving circuit 6 is operated to increase the tape speed.

Conversely, if the tape speed is faster than, the speed instructions, the values of the first and second U/D counter 21 and 22 become larger. As a result, the generated torque of the T reel motor 7 is operated in the direction along which the tape speed is decreased. In this manner, the tape speed is controlled so as to conform to the given tape speed instructions.

Here the operation of the second U/D counter 22 will be described.

Figure 8A:
FIGS. 8(a)-8(c) are waveform charts for illustrating the operation of a second U/D counter 22 in FIG. 1.
Figure 8B:
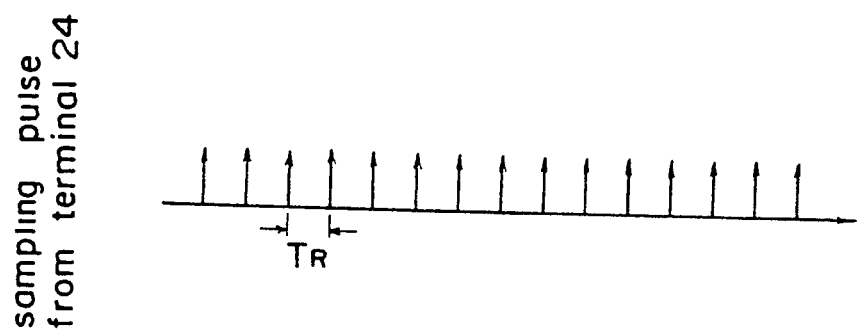
Figure 8C:
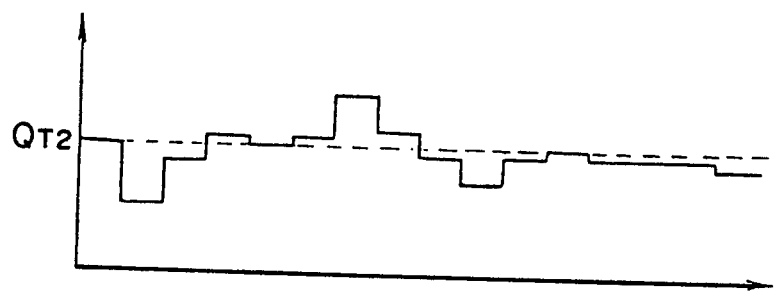
Figure 9A:
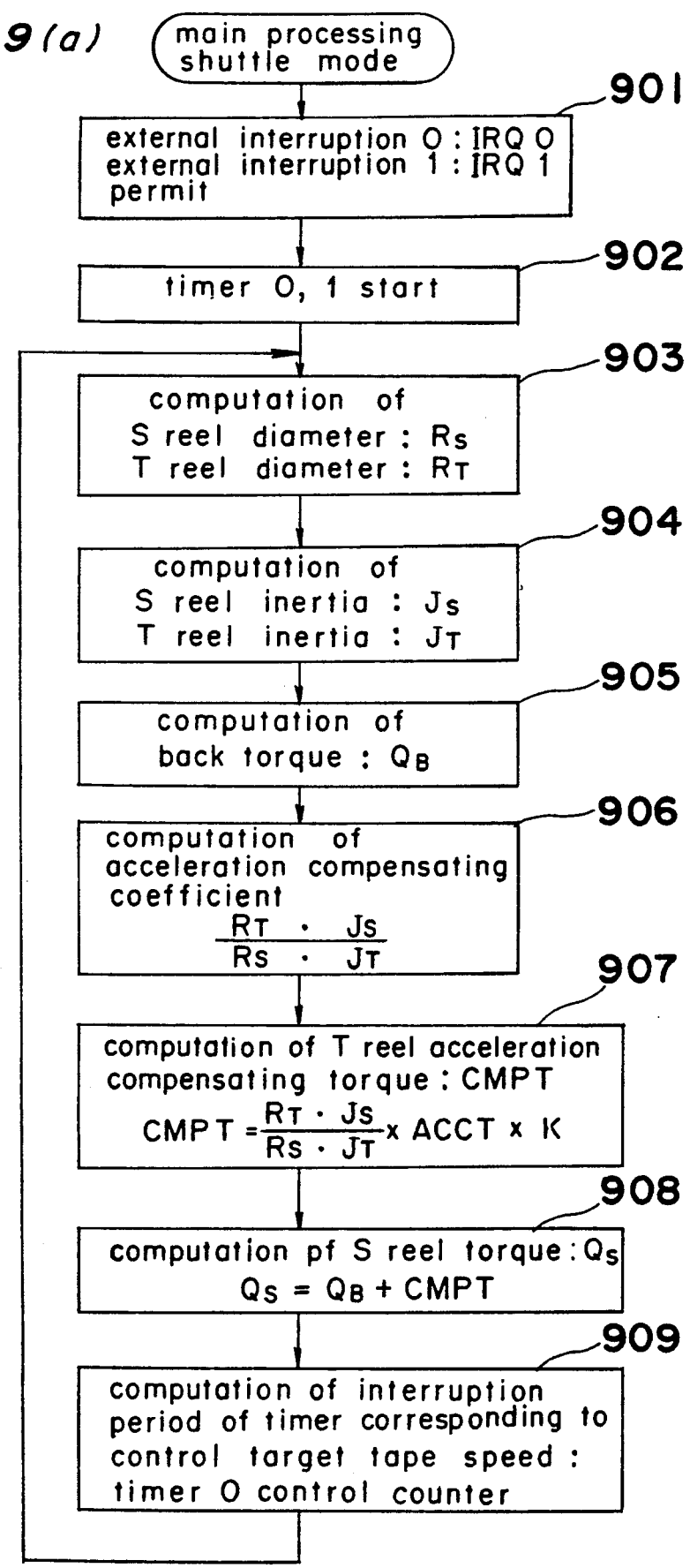
FIGS. 9 (a) to 9(e) are flowcharts when the block 26 in FIG. 1 is composed of microcomputers.
Figure 9B:
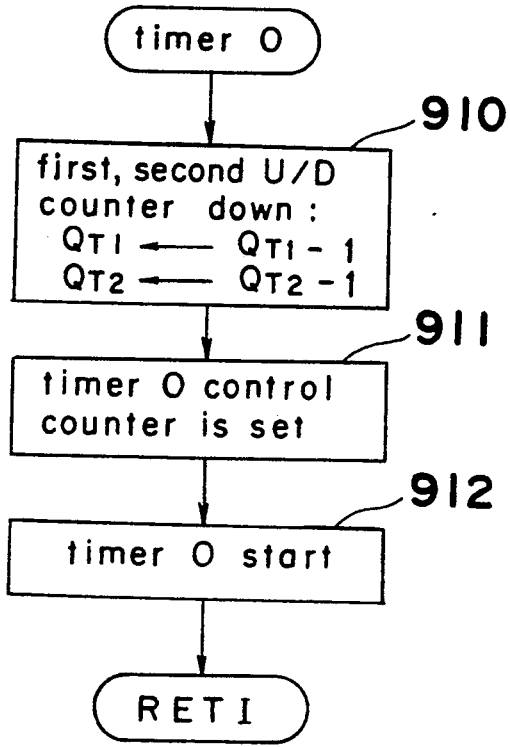
Figure 9E:
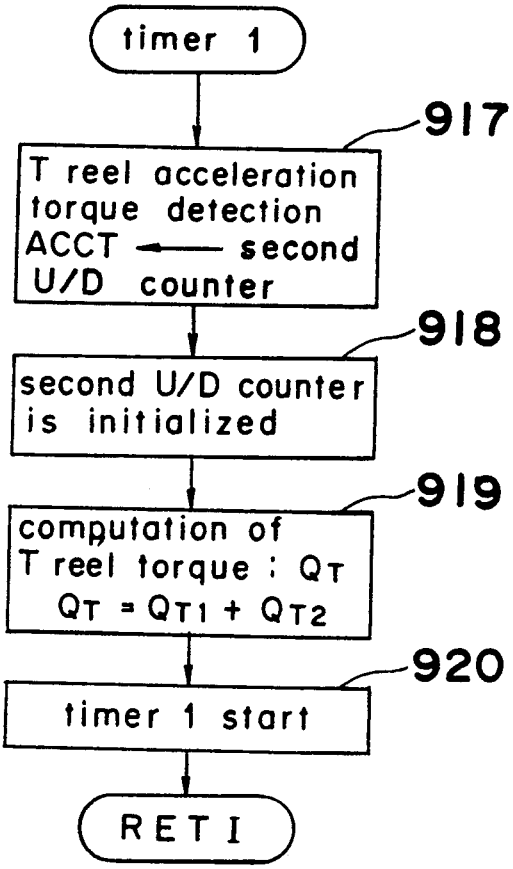
Figure 9C:
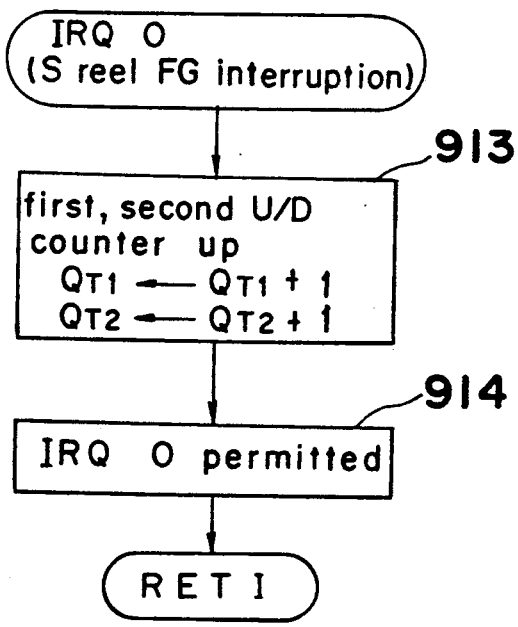
Figure 9D:
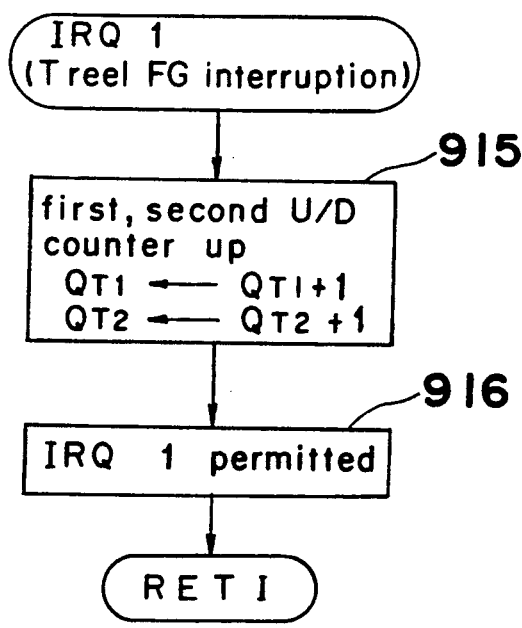

FIGS. 8(a)-8(c) are waveform charts showing the relationship among the second U/D counter value, the sampling pulse to be fed from the terminal 24, and the output $Q_{T2}$ of the second U/D counter 22. As shown in FIG. 8(b), the sampling pulse is fed at the constant period $T_R$ to the second U/D counter 22, the value $Q_{T2}$ of the second U/D counter 22 in the timing is outputted, the output value is retained until the timing of the next sampling. The value of the second U/D counter 22 is set to the initial value (the value of the center in the present embodiment) as shown in FIG. 8(a) after the sampling, and effects the count up, and the count down until the next sampling pulse comes. FIG. 8(c) shows the output information $Q_{T2}$ of the second U/D counter 22.

The second U/D counter 22 is operated as described hereinabove so that the differentiated information of the value of the first U/D counter 21 may be obtained.

By the use of two U/D counters in construction as described hereinabove, such effects as described hereinabove are caused.

(1) As the tape speed control system is a secondary system of control system, the application of the differentiated information upon the error information $Q_T$ to be fed to the winding side motor means that the operation of adding the phase leading element has been applied upon the control error signal so as to improve the stability of the control system.

(2) The second U/D counter output information $Q_{T2}$ shows the acceleration, deceleration torque information of the T reel 2. It is easier to use the information for the control of the tension to be described in the following.

(3) The acceleration/deceleration torque information of the T reel 2 may be correctly detected if the environment changes in the tape driving apparatus and the tape running load changes. The torque information change portion of the T reel 2 by the change in the tape running load is absorbed as change in the first U/D counter 21. Therefore, it shows the acceleration/deceleration torque information of the T reel 2 to the second U/D counter 22. It can be used for the information to correct the, tension fluctuations accompanied by the acceleration/deceleration of such T reel as described later.

The detection of the torque amount spent in the acceleration/deceleration of the T reel 2 is effected by the T reel acceleration/deceleration torque detector 15. The T reel acceleration/deceleration torque detector 15 is composed of a tape speed detector 16 for detecting the actual tape speed from the rotation pulses fs and ft of both the reels, a tape speed reference pulse generator 20 for generating the pulses of the frequency proportional to the target speed instructions to be fed from the the terminal 19 and first and second U/D counters 21, 22 and the adder 23, and a T reel acceleration/deceleration torque computer 27. The output information $Q_{T2}$ of the second U/D counter 22 is fed to the T reel acceleration/deceleration computer 27 so as to effect the polarity discrimination as to whether the direction is the accelerating direction or the decelerating direction from the information $Q_{T2}$, and the proportional coefficient information K and the torque information ACCT equivalent to the torque amount spent in the acceleration/deceleration operations are outputted to the T reel acceleration compensating torque computer 17.

Figure 4:
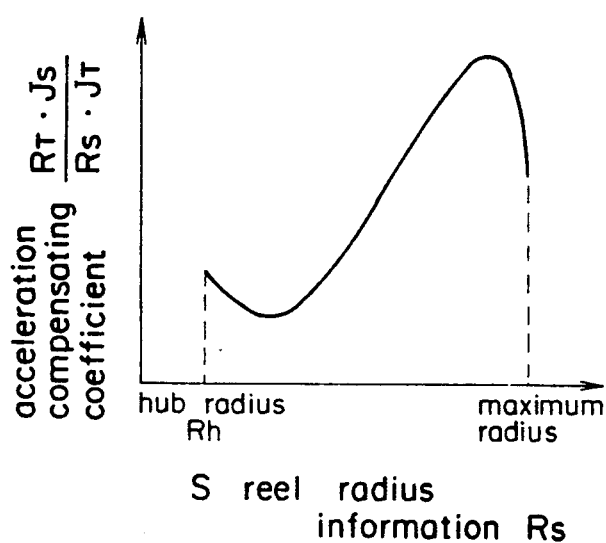
FIG. 4 is a characteristic chart showing one example of an acceleration compensating coefficient $(R_T.Js/Rs.J_T)$ with respect to the S reel radius information Rs.

Both the S and T reel radius information Rs and $R_T$, both the reel inertia information Js and $J_T$, the T reel acceleration/deceleration torque information ACCT and the proportional coefficient information K are inputted to effect the operation shown in the formula (9) and to compute the torque correcting information CMPT of the S reel motor 11 for effecting the tension suppression to be fluctuated in the acceleration/deceleration of the T reel. FIG. 4 is a characteristic chart showing the operational results of the acceleration correcting coefficients $(R_T \cdot Js) / (Rs \cdot J_T)$ corresponding to the radius information Rs of the S reel. The torque correcting information CMPT is obtained through multiplication of the acceleration compensating coefficients $(R_T \cdot$ Js) /(Rs . J$_T$) by the T reel acceleration torque information ACCT, the proportional coefficient K, wherein K is determined by the running path of the tape and the like.

The back torque information Q$_B$ proportional to the S reel diameter is fed to the adder 18 so as to add it to the torque correcting information CMPT to be outputted from the T reel acceleration compensating torque computer 17 by the adder 18. The addition results Qs are outputted to the S reel motor driving circuit 10 as the tension control error information.

Although the construction does not use the tension detecting sensor, the tension changes by the static winding diameter difference and the dynamic tension fluctuations to be caused by the tape acceleration/deceleration may be suppressed in the above described tension control system.

The microcomputer and the digital . signal . processor have the functions of various operations, information storing, timer and so on, are used widely in the electronic appliances. Even in the present embodiment, the block 26 surrounded by the dotted lines of FIG. 1 may be composed of microcomputers, digital . signal . processors, thus contributing towards the smaller size, lighter width, smaller space of the circuit in this case.

Also, in the inertia operation of the reel to be used in the tension control, it may be constructed to effect the table retrieving of the results operated in advance so as to shorten the operating time.

FIGS. 9 (a) to 9 (e) are flowcharts wherein the block 26 surrounded by the dotted lines in FIG. 1 is composed of microcomputers. The processings are divided into five blocks.

The S reel FG pulses are inputted to the external interruption terminal 0 terminal, and the T reel FG pulses are inputted to the external interruption 1 so as to start the interruption processings of the IRQ0 and IRQ1 at the edges of the respective pulses.

Also, the microcomputer is adapted to start by two timers. The interruption period of the first timer interruption processing timer 0 is varied by the operation of the value of the interrupt control counter counted by the main processing. The second timer interruption processing timer 1 is set to cause the interruption at a constant period.

The processing of the main processing will be described hereinafter. When the shuttle mode is selected, the microcomputer permits the external interruption 0 and the external interruption 1 (step 901). The timer 0 and the timer 1 are started (step 902). The diameters Rs and Rt of both the reels are calculated from the FG pulses of both the reels and the tape total amount data, the tape thickness data (step 903). The respective inertias Js and Jt are calculated in accordance with the result obtained by the step 903 (step 904). When the calculating operation is complicated, and the computing time becomes long, it is possible to effect the table retrieving operation with the data counted in advance being accommodated in the ROM. The back torque QB is operated with the use of the S reel diameter Rs obtained by the step 903 (step 905). In the step 906, the operation of the acceleration compensating coefficients is effected using the Rs, Rt, Js, Jt obtained by the steps 903 and 904. In the step 907, the multiplication of the acceleration compensating coefficients obtained by the step 906 and the T reel acceleration torque Qt2, the coefficient K to be detected by the processing of the timer 1 are effected, so that the T reel acceleration compensating torque CMPT is obtained. In the step 908, the back torque QB obtained by the step 905 is added to the T reel acceleration compensating torque CMPT obtained by the step 907 so as to obtain the S reel torque Qs. In the step 909, the interruption period of the timer 0 corresponding to the control target tape speed is counted so as to store on the timer 0 control counter the value corresponding to the result. The calculation is operated from the control target tape speed and both the reel diameters as shown in FIG. 5. By the operation result of the step 909, the timer 0 causes the interruption processing at the period corresponding to the control target tape speed, the tape winding condition (winding start through the winding In the main step, the operation of the step 909 is repeated from the step 903.

The operation of the timer 0 processing will be described hereinafter.

When the interruption of the timer 0 is caused, the first and second up down counters Qt1 and Qt2 (RAM within the microcomputer) are respectively counted down (step 910). The timer 0 control counter computed by the main step 909 is set (step 911) to start the timer 0 step 912) so as to prepare for the next interruption.

The external interruption processings IRQ0 and IRQ1 will be described hereinafter. When the edges of the S and T reel FG pulses are inputted to generate the interruption processing, the first and second up down counters Qt1 and Qt2 are respectively counted up (step 913 and step 915) so as to prepare for the next interruption processings (step 914, step 916).

The operation of the timer 1 will be described hereafter.

In the timer 1 interruption processing to be generated for each constant time period, the T reel acceleration torque information is detected. When the interruption is caused, the value of the second up/down counter Qt2 of that time is sampled (step 917), the value is used for the main processing as the T reel acceleration torque information. Therefore, the second up/down counter Qt2 is initialized (step 918). The T reel torque Qt is obtained by the addition between the value of the second up down counter Qt2 sampled and the value of the first up/down counter Qt1 (step 919). The timer 1 is started in preparation for the next interruption (step 920).

By such a series of processings, the block 26 surrounded by the dotted lines in FIG. 1 may be easily composed of the microcomputers.

According to the above described embodiment, by the provision of adding the torque proportional to the supply reel diameter and the compensating torque for suppressing the tension fluctuations in the acceleration/deceleration of the winding reel, the tape damage may be prevented at the transient time of acceleration/deceleration of the tape, instead of at the steady transporting time. Also, the tape speed may be stably controlled in the construction where the U/D counter is provided by two through the detection of the tape speed from the rotation pulses of both the reels. The construction may be effected without the tape speed detection sensor such as timer roller or the like.

Figure 10:
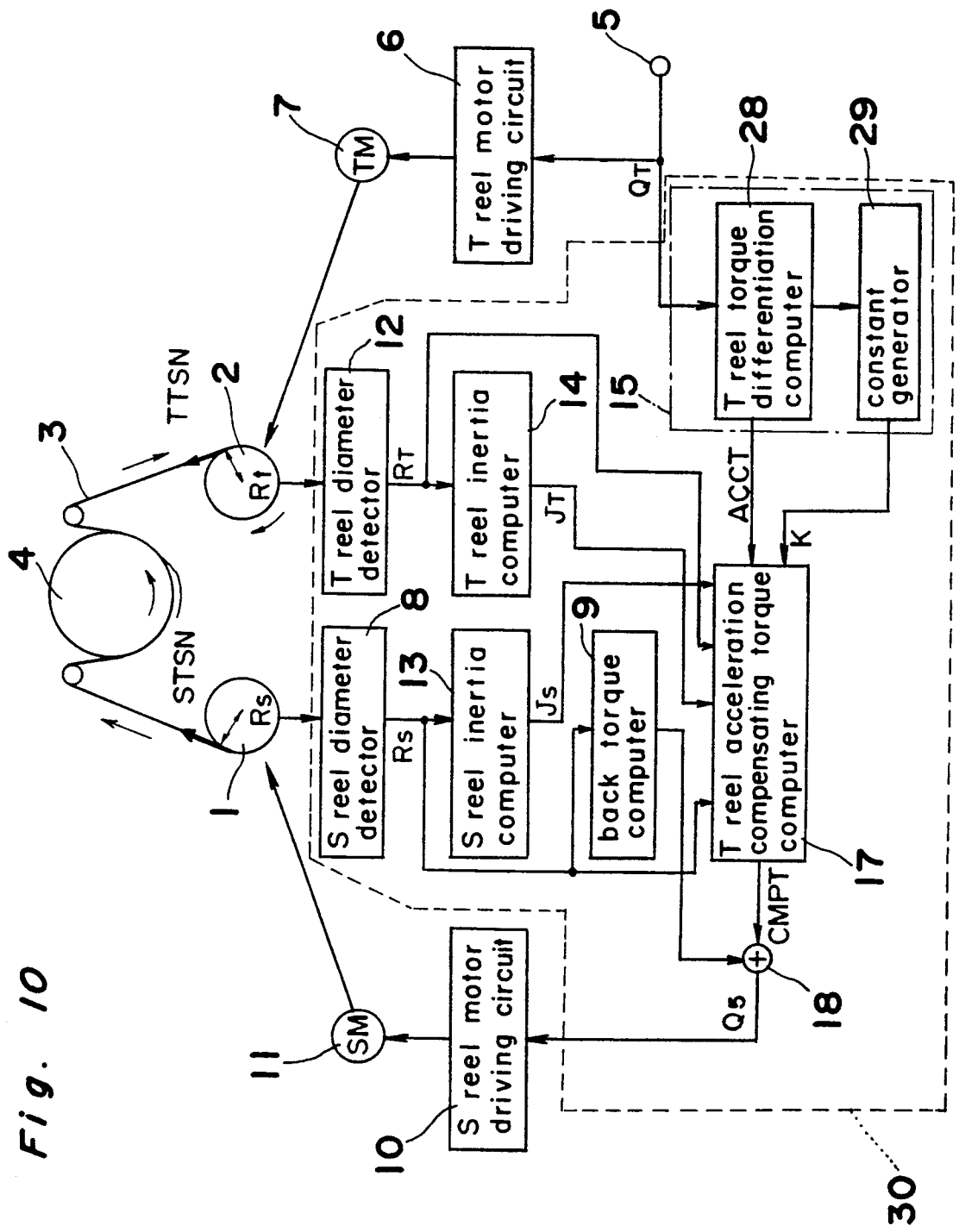
FIG. 10 is a block diagram showing the construction of the tape driving apparatus in accordance with a second embodiment of the present invention.

FIG. 10 is a block diagram of a tape driving apparatus in accordance with a second embodiment of the present invention. The difference between the first embodiment and the second embodiment is in the construction of the T reel acceleration/deceleration torque detecting means 15.

In FIG. 10, the T reel acceleration, deceleration torque detecting means 15 is composed of the T reel torque differentiation computer 28 and the constant generator 29. The T reel motor torque information QT which is fed from the terminal 5 is inputted to the T reel torque differentiation computer 28. The information ACCT of the differentiated T reel torque information is outputted to the T reel acceleration compensating torque computer 17. Also, the output information ACCT of the T reel differentiation computer 28 is inputted to the constant generator 29 to effect the polarity differentiation, so that the proportional constant K corresponding to the results is outputted to the T reel acceleration compensating torque computer 17.

As clear even from the above described formula (9), the T reel acceleration compensating torque information CMPT may be obtained as in the description of the first embodiment if the differentiation information of the T reel motor torque information QT is obtained.

FIG. 11 is a flowchart where the block 30 surrounded by the dotted lines in FIG. 10 is composed of computers.

The processings are largely divided into two blocks between the main processing and the timer 1 processing. After the starting of the timer 1 in the main processing (step 1101), the processings (step 903 through step 908) similar to FIG. 9 are effected.

The timer 1 causes the interrupting processing for each constant time, and the following processings are effected. When the interruption of the timer 1 is caused, the T reel motor torque information QT is read and the read information is stored as the QT (NEW) (step 1102). Then, the information QT (OLD) stored in the previous interruption and the difference information of the information QT (NEW) are computed (step 1103). The difference information is used with the main processing as the T reel torque acceleration/deceleration torque information ACCT. The data is renewed in preparation for the next differentiation operation (QT(OLD)←QT-(NEW) processing 104). Finally, the timer 1 is started (step 920) so as to complete the processing of the timer 1.

In such a series of processings, it may easily constitute the block 30 in FIG. 10 with microcomputers.

As described hereinabove, the present invention is provided with a supply reel diameter detecting means, a winding reel diameter detecting means, a supply reel inertia operating means, a winding reel inertia operating means, a winding reel acceleration/deceleration torque detecting means, a winding reel acceleration compensating torque operating means, a back torque operating means, an adding means, so that it may become possible to stably control the tension with a tension control system which does not use the tension detection center, may become possible to stably control the tape speed in the construction which does not use the tape speed detection sensor. The tape driving apparatus is simplified, is made smaller, lighter. Tape damage is prevented. The access property is superior in the variable speed. Therefore, the practical effects are large.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. A tape driving apparatus for use in a tape medium record reproducing apparatus, comprising:
    a supply reel diameter detecting means for detecting radius information Rs of a supply reel;
    a winding reel diameter detecting means for detecting radius information Rt of a winding reel;
    a supply reel inertial operating means for computing information Js corresponding to the inertia of said supply reel in accordance with said radius information Rs of the supply reel;
    winding reel inertia operating means for computing information Jt corresponding to the inertia of said winding reel in accordance with said radius information Rt of the winding reel;
    a winding reel acceleration and deceleration torque detecting means which includes an up and down counter for modifying a value stored therein according to a difference between a target tape speed information and an actual detected tape speed; said winding reel acceleration and deceleration torque detecting means outputting a winding reel acceleration and deceleration torque information value ACCT obtained by periodically sampling said value stored in said up and down counter at constant time periods and said winding reel acceleration and deceleration torque detecting means setting a value stored in said up and down counter to a value corresponding to a zero speed error which corresponds to said target tape speed information being equal to said actual detected speed, after outputting said winding reel acceleration and deceleration torque information value ACCT;
    a winding reel acceleration degree compensating torque computing means for computing acceleration compensating torque information CMPT corresponding to an acceleration and deceleration of said winding reel by the following equation using said radius information Rs and Rt of both of said reels, said inertia information Js and Jt of both of said reels, and said winding reel acceleration and deceleration torque information ACCT;

$$CMPT = \{(Rt \times Js)/(Rs \times Jt)\} \times ACCT[\times K]$$

a back torque operating means for computing a back torque information in proportion to said radius information Rs of said supply reel; and
    an adding means for adding said back torque information to said acceleration compensating torque information CMPT, whereby a motor torque of said supply reel is controlled on the basis of torque information which is the sum of said acceleration compensating torque information CMPT and said back torque information.

2. A tape driving apparatus, as recited in claim 1, further comprising:
    a tape speed reference pulse generator for generating a pulse output of a frequency proportional to a target tape speed;
    a tape speed detector for detecting an actual tape speed;
    a first up and down counter for outputting a first piece of output information having a value which is increased or decreased according to the difference between said target tape speed outputted from said tape speed reference pulse generator and said actual tape speed outputted from said tape speed detector;

a second up and down counter for outputting a second piece of output information having a value which is sampled at certain times and is increased or decreased according to the difference between said target tape speed outputted from said reference pulse generator and said actual tape speed outputted from the tape speed detector, and for initializing said output of said second up and down counter, an adding means for adding said first piece of output information form said first up and down counter and said second piece of output information from said second up and down counter and for providing output information corresponding thereto, said output information from said adding means being supplied to a winding side motor drive circuit to control a winding side reel motor torque of a winding side reel motor used to drive a winding side reel.

3. A tape driving apparatus as recited in claim 2, wherein said tape speed detector is adapted to effect a detecting operation using frequency information proportional to the rotation of said supply reel and frequency information proportional to the rotation of said winding reel.

* * * * *